United States Patent
Chun

(10) Patent No.: US 9,545,973 B2
(45) Date of Patent: Jan. 17, 2017

(54) ELECTRIC BICYCLE AND CONTROL METHOD THEREOF

(71) Applicant: MANDO CORPORATION, Pyeongtaek-si (KR)

(72) Inventor: Jae-Hyung Chun, Yongin-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/575,947

(22) Filed: Dec. 18, 2014

(65) Prior Publication Data

US 2016/0144928 A1 May 26, 2016

(30) Foreign Application Priority Data

Nov. 20, 2014 (KR) .......................... 10-2014-0162378

(51) Int. Cl.
| | |
|---|---|
| *B62M 6/45* | (2010.01) |
| *B62M 6/50* | (2010.01) |
| *B62M 6/65* | (2010.01) |
| *B62M 19/00* | (2006.01) |

(52) U.S. Cl.
CPC .................. *B62M 6/45* (2013.01); *B62M 6/50* (2013.01); *B62M 6/65* (2013.01); *B62M 19/00* (2013.01)

(58) Field of Classification Search
CPC ............. B62M 6/45; B62M 6/50; B62M 6/65; B62M 19/00
USPC .......................................................... 701/22
See application file for complete search history.

(56) References Cited

U.S. PATENT DOCUMENTS

| 2009/0181826 A1* | 7/2009 | Turner ............... A63B 24/0062 |
| | | 482/4 |
| 2011/0160945 A1* | 6/2011 | Gale ..................... B60L 3/0023 |
| | | 701/22 |

FOREIGN PATENT DOCUMENTS

| CN | 1765692 | 5/2006 |
| EP | 0 926 059 | 6/1999 |
| FR | 2 436 036 | 4/1980 |
| JP | 2000-247287 | 9/2000 |
| JP | 2002-166873 | 6/2002 |
| JP | 2002166873 A | * 6/2002 |

(Continued)

OTHER PUBLICATIONS

Office Action dated May 25, 2016 for Korean Patent Application No. 10-2014-0162378.

(Continued)

*Primary Examiner* — Brian P Sweeney
(74) *Attorney, Agent, or Firm* — Ladas & Parry, LLP

(57) ABSTRACT

An electric bicycle and a method of controlling the same are disclosed. The electric bicycle according to one embodiment of the present invention includes a weight sensing unit for sensing a rider's weight; a motor output controlling unit for controlling a motor driving output; and an electronic control unit for varying the motor output through the motor output controlling unit according to the weight sensed by the weight sensing unit, and the weight sensing unit classifies the rider's weight into a standard weight mode, an underweight mode, and an overweight mode according to the sensed weight, and if the weight is in the underweight mode, the weight sensing unit reduces the motor output to a value below the motor output for the standard weight mode and if the weight is in the overweight mode, the weight sensing unit increases the motor output to a value above the motor output for the standard weight mode.

10 Claims, 8 Drawing Sheets

(56) References Cited

FOREIGN PATENT DOCUMENTS

| | | | |
|---|---|---|---|
| JP | 2004-1735 | 1/2004 | |
| JP | 2007-145277 | 6/2007 | |
| JP | 2011-5936 | 1/2011 | |
| KR | WO 2011118867 A1 * | 9/2011 | ............... A61B 5/11 |

OTHER PUBLICATIONS

Extended European Search Report dated Apr. 14, 2016 for European Patent Application No. 14199072.1.

* cited by examiner

ELECTRIC BICYCLE AND CONTROL METHOD THEREOF

CROSS-REFERENCE TO RELATED APPLICATION

This application claims the benefit of Korean Patent Application No. 10-2014-0162378, filed on Nov. 20, 2014, in the Korean Intellectual Property Office, the disclosure of which is incorporated in its entirety herein by reference.

BACKGROUND

1. Field

Embodiments of the present invention relate to an electric bicycle and a method of controlling the same, and more particularly, to an electric bicycle which varies an output of a driving motor according to a weight to enhance a rider's riding sensibility, and a method of controlling the same.

2. Description of the Related Art

In general, an electric bicycle includes a motor to rotate wheels and a battery to supply electric power to the motor. In other words, the electric bicycle to which a generator is mounted or the series hybrid type electric bicycle is travelled by a method in which a motor which is electrically connected to a battery rotates wheels, and the battery is charged by the generator which is connected to a pedal and is operated by a rotation of the pedal.

Basically, a rider presses down pedals to move a bicycle, and a chain transmits a force of the rider pressing down the pedals to wheels. Since a plurality of chain pins meshed with a sprocket are connected to each other, the chain has a complicated structure. And, a space occupied by the chain is large in the bicycle and the chain is deviated from the wheel or a rider's cloth gets caught in the chain so that the cloth is getting dirty.

Recently, an electric bicycle which is not provided with a chain has been developed and used in the light of the above problem. If a rider manipulates a button provided on a handle or presses down pedals, a motor is operated and the chainless electric bicycle is moved forward.

In the chainless electric bicycle, a pedal load is adjusted so that the rider can feel a pedal feeling which can be felt due to actual pedals when the rider presses down the pedals. Therefore, a pedal effort is generated when the rider presses down the pedals to enable the rider to feel the pedal feeling.

In addition, the chainless electric bicycle is set to allow the motor to generate a force required for rotating a wheel, i.e., a motor output, and this motor output is basically determined on the basis of a standard weight to optimize a riding feeling.

In general, one motor output which is initially predetermined according to a standard weight is set in the electric bicycle. Therefore, although a standard weight rider feels a comfortable riding feeling according to a pedaling when riding the electric bicycle, if a rider having a weight, which is below the standard weight, rides the electric bicycle, a quick start and a rapid acceleration may be occurred, and if a rider having a weight, which is above the standard weight, rides the electric bicycle, a delayed start or a delayed acceleration is occurred or it is sometime difficult for the electric bicycle to climb the hill in a severe case.

SUMMARY

An object of the present invention is to provide an electric bicycle which can vary an output of a motor according to a rider's weight and a method of effectively controlling the electric bicycle.

According to one aspect of the present invention, an electric bicycle includes a weight sensing unit configured to sense a rider's weight; a motor output controlling unit configured to control a motor driving output; and an electronic control unit configured to vary the motor output through the motor output controlling unit according to the weight sensed by the weight sensing unit.

Here, the weight sensing unit may be provided on at least one of a saddle, a pedal, a wheel, and a middle frame.

Also, the electronic control unit may further include an interface device, and the weight sensing unit may receive the information on the rider's weight through the interface device.

In addition, the weight sensing unit may classify the rider's weight into a standard weight mode, an underweight mode, and an overweight mode according to the sensed weight, and if the weight is in the underweight mode, the weight sensing unit may reduce the motor output to a value below the motor output for the standard weight mode and if the weight is in the overweight mode, the weight sensing unit may increase the motor output to the value above the motor output for the standard weight mode.

Furthermore, the weight sensing unit may include a switching part disposed between and connected in series to a battery and a motor, and the electronic control unit may control an operation of the switching part according to the standard weight mode, the underweight mode, and the overweight mode in a pulse width modulation method.

The electric bicycle of the present invention may further include a road condition sensing unit.

In addition, the electric bicycle of the present invention may further include a speed sensing unit configured to sense a speed of the electric bicycle, and if the speed sensed by the speed sensing unit is less than a predetermined speed, the electronic control unit may control the motor output controlling unit on the basis of the weight in the weight sensing unit to vary the output of the motor.

According to another aspect of the present invention, a method of controlling an electric bicycle includes classifying a rider's weight into a standard weight mode, an underweight mode, and an overweight mode; and maintaining a motor output for the standard weight mode if a sensed weight is in the standard weight mode, reducing the motor output to a value below the motor output for the standard weight mode if the sensed weight is in the underweight mode, and increasing the motor output to a value above the motor output for the standard weight mode if the sensed weight is in the overweight mode.

Also, the method may further include sensing a condition of a road on which the electric bicycle is traveled and varying the motor output according to the sensed road condition may be provided.

In addition, the method may further include sensing a speed of the electric bicycle and varying the motor output on the basis of the sensed weight if the sensed speed of the bicycle is less than a predetermined speed may be provided.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
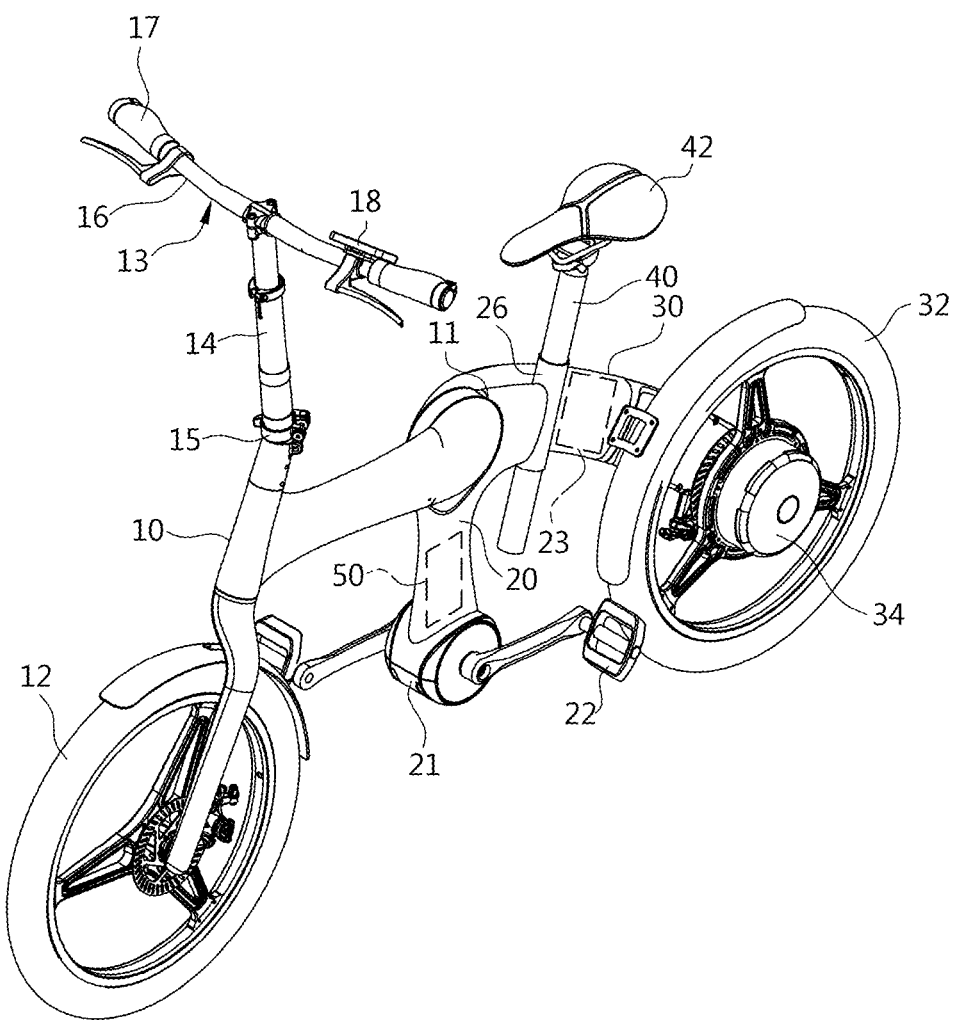
FIG. 1 is a view illustrating an electric bicycle according to one embodiment of the present invention.

Reference will now be made in detail to the preferred embodiments of the present invention, examples of which are illustrated in the accompanying drawings. These embodiments are provided so that this disclosure will be thorough and complete, and will fully convey the spirit and scope of the present invention to those skilled in the art. Other embodiments may also be provided. Constituent elements other than elements constituting essential features of the present invention may be omitted from the drawings, for clarity of description. In the drawings, the widths, lengths, and thicknesses of constituent elements may be exaggerated for clarity and convenience of illustration. Like reference numerals refer to like elements throughout.

FIG. 1 is a perspective view of an electric bicycle according to one embodiment of the present invention. Referring to the drawing, the electric bicycle includes a front frame 10, a middle frame 20, a rear frame 30, and a saddle frame 40.

The front frame 10, the middle frame 20, and the rear frame 30 are shaft-coupled to a hinge shaft (not shown), and these frames can be pivoted about the hinge shaft in the forward and rearward direction. Reference numeral 11 indicates a hinge plate to which the frames 10, 20, and 30 are pivotably coupled.

The front frame 10 includes a front wheel 12 and a handle stay 14 to which a handle part 13 is connected.

The handle part 13 includes a handle stem 15 coupled to a lower end of the handle stay 14, a handle bar 16 coupled to the handle stay 14, and handle grips 17 provided at the handle bar 16.

The handle stem 15 is provided to adjust a level of the handle part 13, and the handle bar 16 is provided to steer the electric bicycle. An interface device 18 is provide on the handle grip 17, which can display a status of the electric bicycle to a rider and transmit the rider's commands to an electronic control unit 50, which will be described later, through a button or a display. The interface device 18 is electrically connected to the electronic control unit 50. The front wheel 12 is rotatably coupled to one side of a lower end of the handle stay 14.

A generator 21 is provided at one end of the middle frame 20, and pedals 22 are rotatably mounted to opposite sides of the generator 21. When the rider rotates the pedals 22, a rotating force of the pedals 22 is converted into an electrical energy in the generator 21 and the electrical energy generated in the generator 21 may be accumulated in a battery 23 provided on the rear frame 30, which will be described later.

A rear wheel 32 is rotatably mounted to one side of one end of the rear frame 30. A motor 34 is provided on the rear wheel 32 to rotate the rear wheel 32 and thus to forwardly move the electric bicycle. The motor 34 may include a transmission in order to change a rotation speed of the rear wheel 32 when the rider manipulates the interface device 18.

In addition, the battery 23, which accumulates the electrical energy converted through the generator 21, and the electronic control unit 50 may be mounted in the rear frame 30. At this time, if the front frame 10 or the middle frame 20 has a sufficient space, the battery 23 may be also mounted in the front frame 10 or the middle frame 20.

The saddle frame 40 may be provided on the middle frame 20. As can be seen from the drawing, one side of the saddle frame 40 is coupled to a rear portion of a seat tube 26 which is provided to protrude from a rear portion of the middle frame 20. A saddle 42 on which the rider will sit is mounted to one end of the saddle frame 40. The middle frame 20 may be formed integrally with the seat tube 26.

Figure 2:
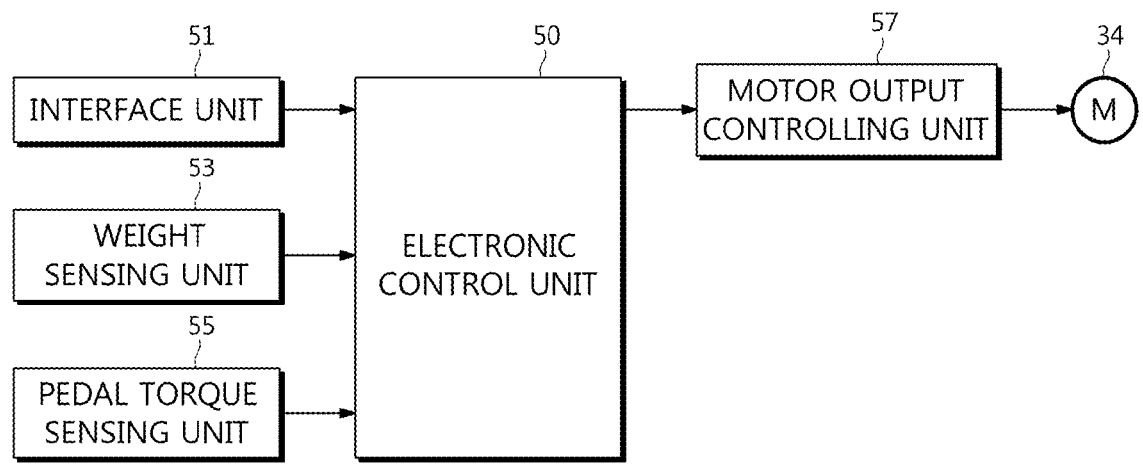
FIG. 2 is a control block diagram of an electric bicycle according to one embodiment of the present invention.

FIG. 2 is a control block diagram of the electric bicycle according to one embodiment of the present invention.

Referring to FIG. 2, the electric bicycle according to this embodiment includes the electronic control unit 50, an interface unit 51, which is electrically connected to the electronic control unit, a weight sensing unit 53, a pedal torque sensing unit 55, and a motor output controlling unit 57.

The interface unit 51 includes the interface device 18 which not only displays a status of the electric bicycle to the rider, but also transmits the rider's commands, which is inputted by a button, to the electronic control unit 50. The information on the status of the electric bicycle, which is displayed on a display of the interface device 18 may include a rider authentication, a traveling speed, a location tracing, a battery residual, and the like, and the rider's commands inputted through the button and the display may include a command for adjusting a speed, a command for adjusting a traveling condition, an input of weight, and the like.

The weight sensing unit 53 senses the rider's weight. In the weight sensing unit 53, a load cell may be employed as a weight measuring sensor and may be provided between the saddle frame 40 and the saddle 42. When the rider sits on the saddle 42, the weight sensing unit 53 measures the weight and transmits the signal on the measured weight to the electronic control unit 50.

Here, although this embodiment illustrates exemplarily that the load cell is provided on the saddle, the weight sensing unit 53 is not limited thereto, but may be provided on the pedal for sensing the rider's weight when the rider stands on and rides the bicycle or on the front wheel 12, the rear wheel 32, or the middle frame 20 for sensing the rider's weight when the bicycle is being travelled. In addition, the above structures may be combined to sense the rider's weight in an optimum state.

The pedal torque sensing unit 55 may include a torque sensor provided on a pedal crankshaft of the middle frame 20. The torque sensor senses a force exerted by the rider to rotate the pedal, that is, a pedal torque. The signal representing the pedal torque sensed by the pedal torque sensing unit 55 is transmitted to the electronic control unit 50.

Here, although this embodiment illustrates exemplarily that the torque applied to the pedal is measured to generate a motor-driving command, the present invention is limited thereto, and it is possible to sense a rotational speed of the pedal and utilize it to generate the motor-driving command.

The motor output controlling unit 57 adjusts an output of the motor 34. Unlike the bicycle provided with a chain, since the chainless electric bicycle is not travelled by a pedaling, a rotation of the wheel, for example, the motor output should be constantly varied to a value which is predetermined according to the pedaling.

The above concept is more concretely described with reference to FIG. 3. The electronic control unit 50 calculates a pedal speed (RPM), which is sensed by the pedal torque sensing unit 55, on the basis of the motor output mapping information in which a motor output is predetermined according to the pedal speed on the basis of a standard model weight, and then controls the motor output (Watt) according to the pedaling speed. As one example, if the pedal speed is increased, the electronic control unit raises proportionately the motor output to increase a rotational speed of the wheel. On the contrary, if the pedal speed is decreased, the electronic control unit lowers the motor output to reduce the rotational speed of the wheel. The straight line S1 in the graph shown in FIG. 3 indicates the riding sensibility optimized according to the standard model weight through many experiments. If the electronic control unit controls the motor output as shown in FIG. 3, the rider feels comfortable when riding the bicycle.

Figure 3:
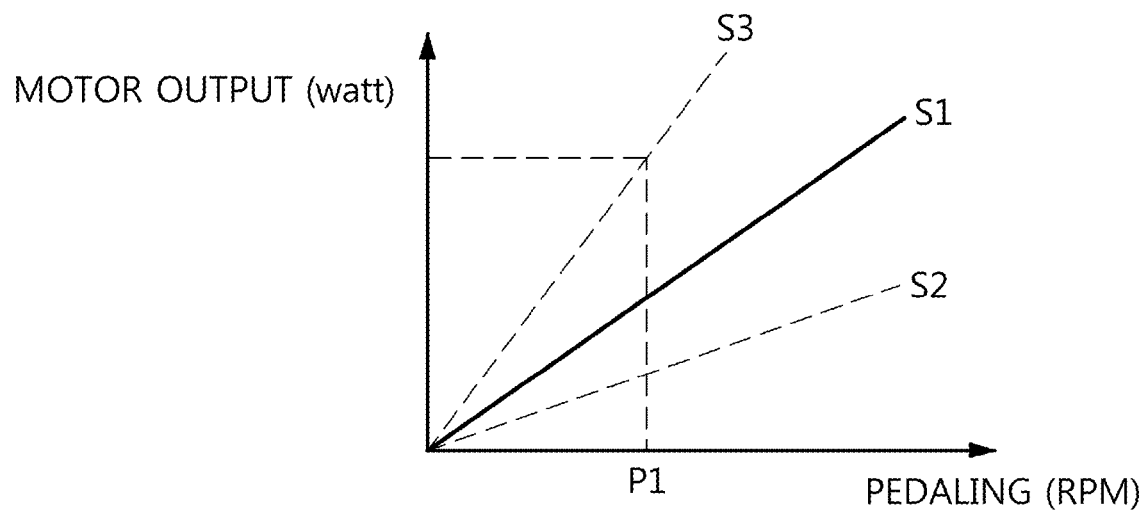
FIG. 3 is a graph illustrating a motor output control according to a weight in an electric bicycle according to one embodiment of the present invention.

The electric bicycle according to the present embodiment senses the rider's weight using the weight sensing unit 53 as described above and controls variably an increment of the motor output on the basis of on gradients of the straight lines in FIG. 3, that is, the pedaling speed according to the sensed weight. If the straight line S1 in FIG. 3 is defined as the motor output control for a standard weight mode of the weight of 70 to 80 kg, the straight line S2 represents the motor output control for an underweight mode of the weight below 70 kg, and the straight line S3 represents the motor output control for an overweight mode of the weight exceeding 80 kg.

Assuming that the pedaling is performed at the same speed P1 in the lines S1 to S3, in other words, if the rider is underweight, the motor output is controlled such that an increment ratio of the motor output for the underweight is lower than that of the motor output for the standard weight, and if the rider is overweight, the motor output is controlled such that an increment ratio of the motor output for the overweight is higher than that of the motor output for the standard weight. Due to this control method, the rider can feel a consistently comfortable riding sensibility regardless of his/hers weight when riding the bicycle.

If, in spite of the underweight rider, the motor output is controlled according to the straight line S1 for the standard weight model, the rider may feel the sensibility of a quick start and a rapid acceleration when a pedaling is carried out. On the contrary, if, in spite of the overweight rider, the motor output is controlled according to the straight line S1 for the standard weight model, the rider feels that the bicycle is not moved forward well when the pedaling is carried out, that is, the riding sensibility such as a delayed start or a delayed acceleration.

Figure 4:
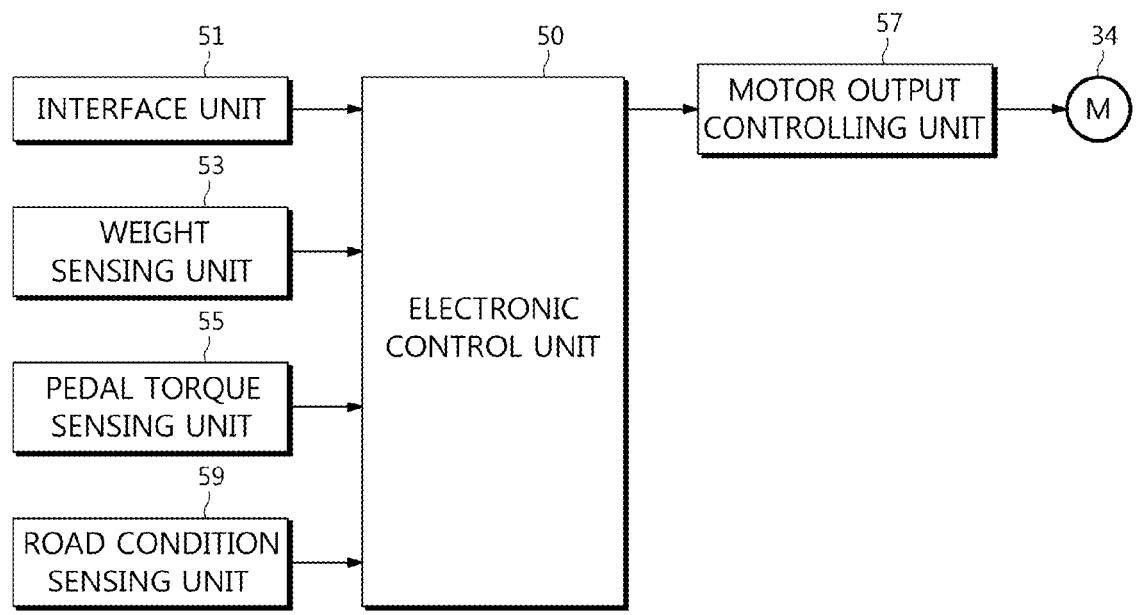
FIG. 4 is a control block diagram of an electric bicycle according to another embodiment of the present invention.
Figure 5:
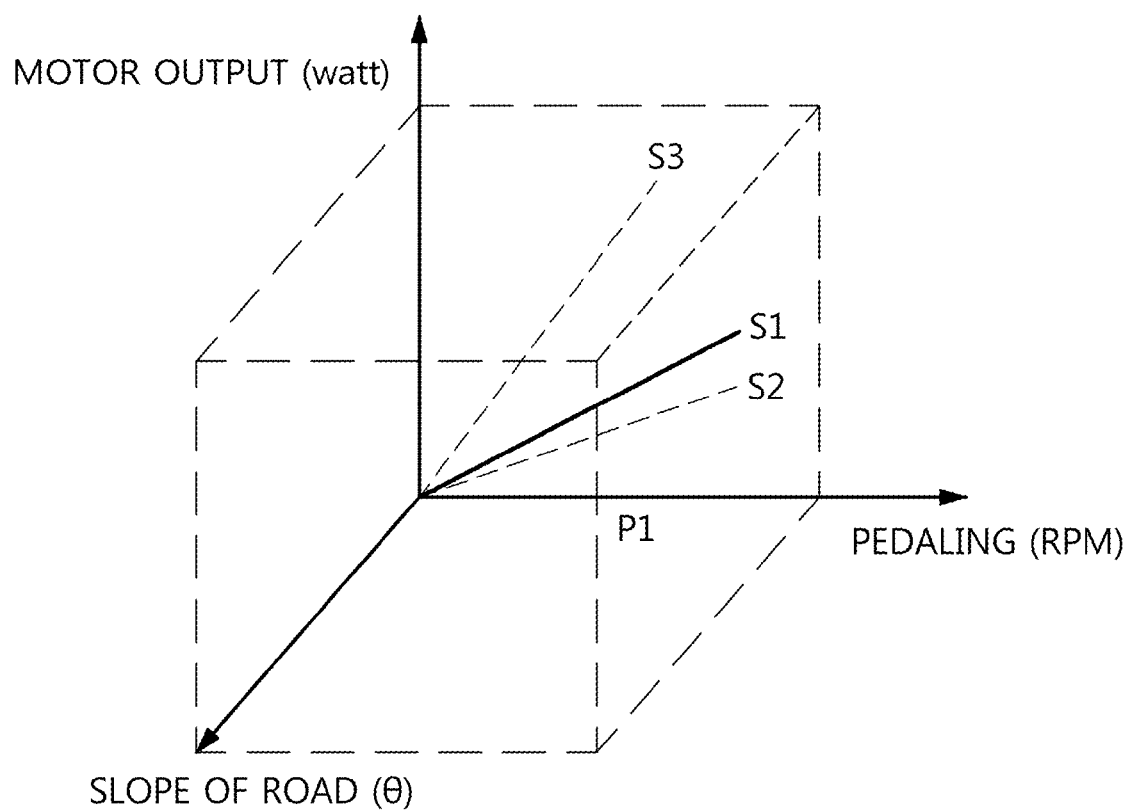
FIG. 5 is a graph illustrating an output control of a motor according to a weight in an electric bicycle according to another embodiment of the present invention.

FIG. 4 and FIG. 5 are the block diagram and the graph illustrating a state in which the motor output of an electric bicycle according to another embodiment of the present invention is controlled. Referring to FIG. 4 and FIG. 5, in addition to the structural elements of the above embodiment, this embodiment further includes a road condition sensing unit 59.

The road condition sensing unit 59 senses a condition of a road on which the bicycle is being traveled. For example, a gyro sensor may be employed as the road condition sensing unit 59, and the electronic control unit may utilize it to judge whether the road is flat or is an uphill/downhill road.

The electronic control unit 50 links the road condition sensed by the road condition sensing unit 59 to the pedal speed and the weight, and then maps them onto the motor output. If the road is flat, the electronic control unit controls the motor output on the basis of the weight as in the one embodiment. If the road is an uphill road, the electronic control unit increases the motor output in addition to the motor output variation according to the weight and if the road is a downhill road, the electronic control unit reduces the motor output in addition to the motor output variation according to the weight. The above motor output control can be 3-dimensionally mapped by including the road condition sensing unit 59 in the motor output control as shown in FIG. 5.

Figure 6:
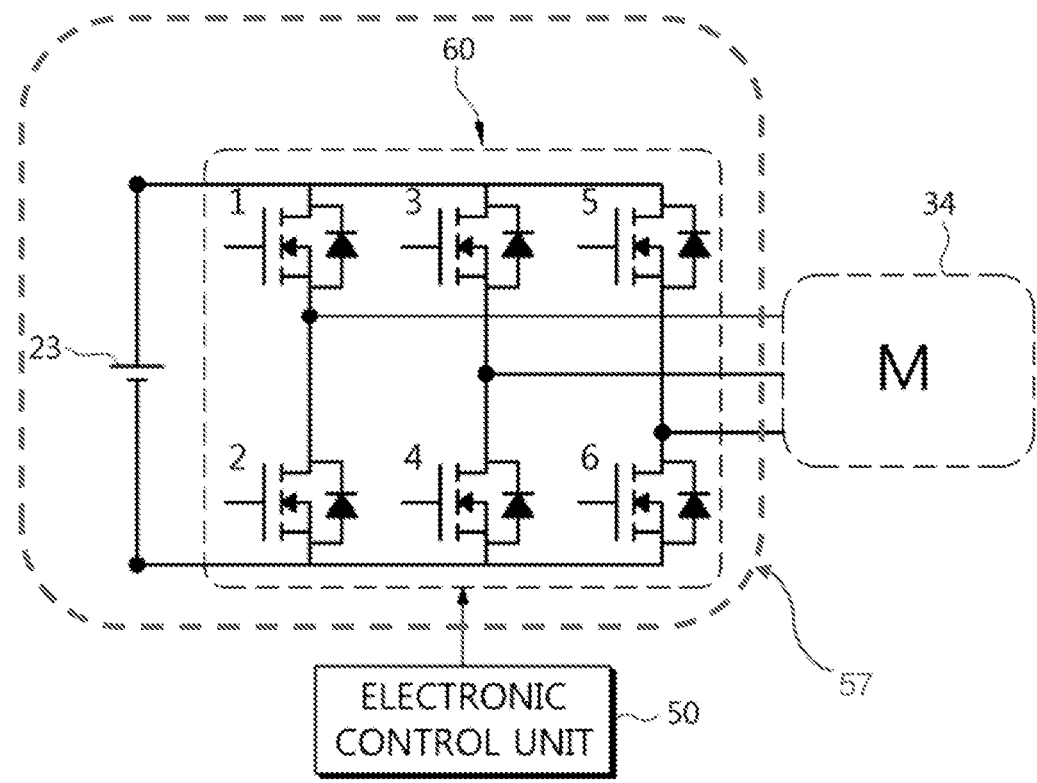
FIG. 6 is a view illustrating a configuration of a motor output controlling unit of an electric bicycle according to one embodiment of the present invention.

FIG. 6 is a view illustrating a configuration and an operation of the motor output controlling unit of the electric bicycle according to one embodiment of the present invention.

Referring to FIG. 6, the motor output controlling unit 57 includes a switching part 60 which is disposed between and connected in series to the battery 23 acting as a power source part and the motor 34 acting as an output part, and this motor output controlling unit controls variably the motor output according to the sensed weight.

The switching part 60 switches the battery 23 to allow a constant voltage of the battery to be supplied to the motor 34. A metal oxide semiconductor field-effect transistor (MOSFET) may be employed as the switching part 60. Although this embodiment exemplarily illustrates an N-MOSFET used as the switching part 60, a P-MOSFET or other suitable switching elements may be utilized as the switching part. The MOSFET has a drain terminal D, a gate terminal G, and a source terminal S, and if a certain voltage is supplied to the gate terminal G, the drain terminal and the source terminal are electrically connected to each other.

The switching part 60 is switched by a motor driving signal output from the electronic control unit 50 to supply a voltage of the battery to the motor 34.

First of all, in order to vary the motor output, more concretely, the electronic control unit 50 controls the switching part 60 using a pulse modulation width (PWM) method. Once the switching part 60 is controlled through the PWM method, the amount of a current supplied from the battery 23 to the motor 34 is adjusted so that the motor output is varied. If the amount of the current supplied to the motor 34 in which a voltage is constantly maintained is increased, the motor output is increased, and if the amount of the current supplied to the motor 34 is decreased, the motor output is reduced. According to the above variation of the motor output, the riders may feel a various riding sensibilities such as a rapid acceleration, a high speed, a slow acceleration, and the like.

Figure 7:
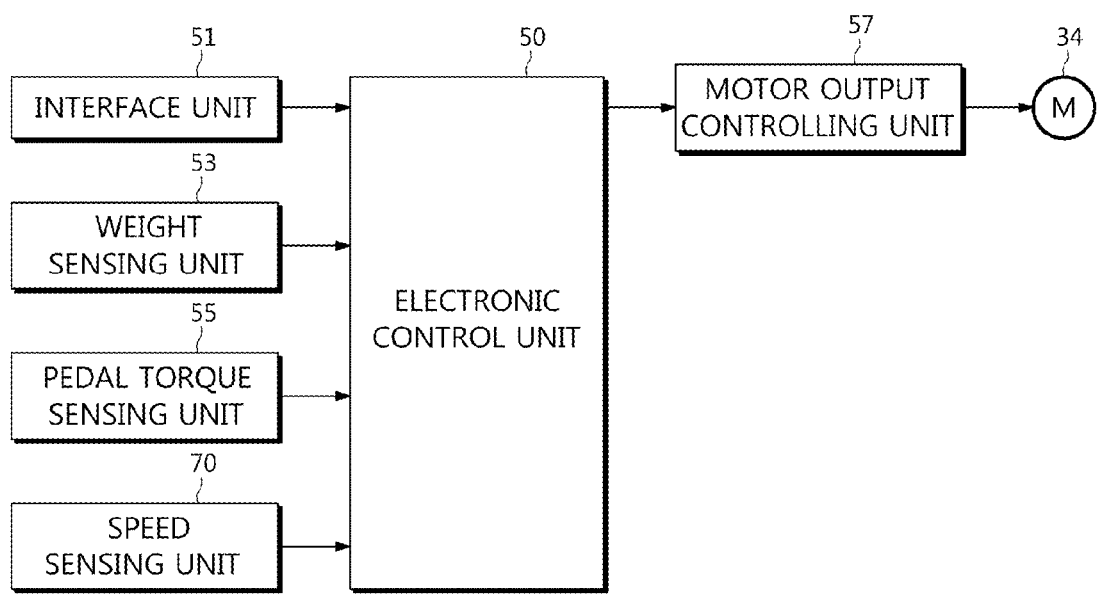
FIG. 7 is a control block diagram of an electric bicycle according to further another embodiment of the present invention.
Figure 8:
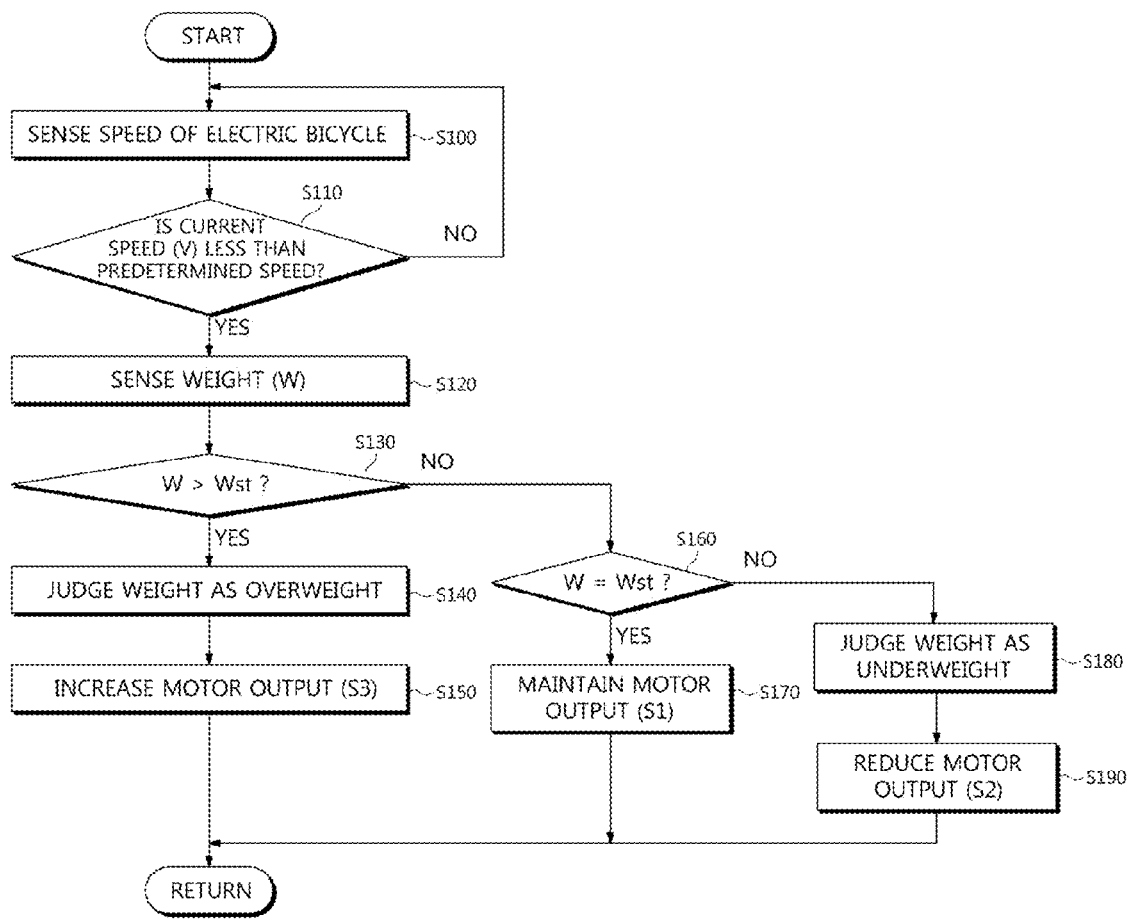
FIG. 8 is a flowchart illustrating a motor output controlling method according to a weight in an electric bicycle according to further another embodiment of the present invention.

FIG. 7 is a control block diagram of an electric bicycle according to further another embodiment of the present invention, and FIG. 8 is a flowchart illustrating a method of controlling the electric bicycle according to the embodiment shown in FIG. 7.

Referring to FIG. 7 and FIG. 8, in addition to the electronic control unit 50, the interface unit 51 which is electrically connected to the electronic control unit, the weight sensing unit 53, and the pedal torque sensing unit 55, the electric bicycle further includes a speed sensing unit 70.

The speed sensing unit 70 senses a speed of the electric bicycle. For example, a wheel speed sensor for sensing a wheel speed of the front wheel 12 or the rear wheel 32 may be utilized as the speed sensing unit 70.

The method of controlling the electric bicycle according to this embodiment is described with reference to FIG. 8. First of all, the electronic control unit 50 senses the speed of the electric bicycle through the speed sensing unit 70 (S100).

Since the rider touches the ground with at least one foot when the electric bicycle begins to travel, it is difficult to measure the correct weight information, and it is also difficult to measure the correct weight information due to the acceleration when the electric bicycle is being traveled at a high speed. Therefore, after sensing the speed of the electric bicycle, the electronic control unit 50 judges whether the speed V of the electric bicycle is less than a predetermined speed (S110).

As the judgment result in the operation mode S110, if the speed V of the electric bicycle is zero (0) or above a predetermined speed, the step is returned to the operation mode S100.

If the current speed V of the electric bicycle is less than the predetermined speed as the judgment result in the operation mode S110, the electronic control unit 50 senses the weight W of the rider through the weight sensing unit 53 (S120)

After sensing the rider's weight, the electronic control unit 50 judges whether the sensed weight exceeds 80 kg which is an upper limit of the standard weight (S130).

As the judgment result in the operation mode S130, if the rider's weight is an overweight (S140), according to the motor output mapping indicated by S3 in FIG. 3, the electronic control unit controls the motor output controlling unit to allow the motor to increase the motor output corresponding to the pedal speed sensed by the pedal torque sensing unit 55, that is, the motor output greater than that generated when the weight is the standard weight (S150).

Meanwhile, as the judgment result in the operation mode S130, if the rider's weight is between 70 and 80 kg which is the standard weight (S160), the electronic control unit controls the motor output controlling unit to allow the motor to maintain a standard motor output according to the motor output mapping indicated by S1 in FIG. 3 (S170).

On the other hand, as the judgment result in the operation mode S160, if the rider's weight is an underweight which is below 70 kg which is a lower limit of the standard weight (S180), the electronic control unit controls the motor output controlling unit to allow the motor to output according to the motor output mapping indicated by S2 in FIG. 3 (S190). In other words, the electronic control unit controls the switching part 60 in the pedal torque sensing unit 55, which is disposed between and connected in series to the battery 23 and the motor 34, in the PWM method to reduce a quantity of the current supplied to the motor 34 and reduce the motor output.

Here, in this embodiment, although it is judged first whether the rider's weight is the overweight, the present invention is not limited thereto, and it is possible to judge first whether the rider's weight is the standard weight or the underweight.

In addition, this embodiment exemplarily illustrates that the weight sensing unit 53 is employed for sensing the rider's weight. However, the present invention is not limited thereto, and the rider inputs in advance his or her weight through the interface unit 51 before riding the bicycle to enable this input to be reflected immediately in the electronic control unit 50 when the electric bicycle is powered-on.

Furthermore, the motor output varied according to the weight may be further subdivided. In addition to the comfortable riding sensibility demand (normal mode), for example, the rider may request further sensibilities such as a desire to comfortably ride even if the bicycle is slow (eco mode), a desire to actively ride the bicycle (sporty mode), and the like. Therefore, it is possible to classify the above desires into the mode types and to more minutely vary the motor output according to theses mode types.

In addition, although the road condition sensing unit is omitted in the embodiment illustrated in FIG. 7 and FIG. 8, it goes without saying that one skilled in the art can modify and change another embodiment to easily apply this road condition sensing unit. Furthermore, even if FIG. 3 and FIG. 5 show the linear motor output mapping according the weight, these mappings are just schematically illustrated and may be appropriately modified and changed.

The electric bicycle and the method of controlling the same according to the embodiment of the present invention vary the motor output according to the rider's weight to enable the overweight rider or the underweight rider to feel a comfortable and pleasant riding sensibility when riding the bicycle. On the basis of the motor output control for the standard weight rider, if the underweight rider rides the bicycle, the motor output according to the pedaling is reduced and if the overweight rider rides the bicycle, the motor output according to the pedaling is increased so that it is possible to provide the riders having the different weights with the same riding sensibility.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electric bicycle, comprising;
a weight sensor sensing a rider's weight;
a motor output controller controlling a motor driving output; and
an electronic control unit configured to vary the motor driving output through the motor output controller according to the rider's weight sensed by the weight sensor,
wherein the electronic control unit classifies the rider's weight into a standard weight mode, an underweight mode, and an overweight mode according to the sensed weight, and
the electronic control unit reduces the motor driving output to a value below the motor driving output for the standard weight mode when the sensed weight is in the underweight mode, and the electronic control unit increases the motor driving output to a value above the motor driving output for the standard weight mode when the sensed weight is in the overweight mode.

2. The electric bicycle of claim 1, wherein the weight sensor is provided on at least one of a saddle, a pedal, a wheel, and a middle frame.

3. The electric bicycle of claim 1, wherein the electronic control unit further comprises an interface device, and
the weight sensor receives information on the rider's weight through the interface device.

4. The electric bicycle of claim 1, wherein the weight sensor comprises a switching part disposed between and connected in series to a battery and a motor, and
the electronic control unit controls an operation of the switching part according to the standard weight mode, the underweight mode, and the overweight mode in a pulse width modulation method.

5. The electric bicycle of claim 1, further comprising a speed sensor sensing a speed of the electric bicycle, and
wherein the electronic control unit controls the motor output controller on the basis of the weight sensed the weight sensor to vary the motor driving output when the speed sensed by the speed sensor is less than a predetermined speed.

6. An electric bicycle, comprising;
a weight sensor sensing a rider's weight;
a motor output controller controlling a motor driving output;
an electronic control unit configured to vary the motor driving output through the motor output controller according to the rider's weight sensed by the weight sensor; and
a road condition sensor.

7. An apparatus of controlling an electric bicycle, comprising;
a weight sensor classifying a rider's weight into a standard weight mode, an underweight mode, and an overweight mode; and
an electronic control unit maintaining a motor output for the standard weight mode if a sensed weight is in the standard weight mode, reducing the motor output to a value below the motor output for the standard weight mode if the sensed weight is in the underweight mode, and increasing the motor output to a value above the motor output for the standard weight mode if the sensed weight is in the overweight mode.

8. The apparatus of claim 7, further comprising a road condition sensor sensing a condition of a road on which the electric bicycle is traveled and varying the motor output according to the sensed road condition.

9. The apparatus of claim 7, further comprising a speed sensor sensing a speed of the electric bicycle and varying the motor output on the basis of the sensed weight when the sensed speed of the bicycle is less than a predetermined speed.

10. The apparatus of claim 7, further comprising a switching part disposed between and connected in series to a battery and a motor, and
the electronic control unit controls an operation of the switching part according to the standard weight mode, the underweight mode, and the overweight mode in a pulse width modulation method.

* * * * *